Dec. 18, 1956  E. F. MEKELBURG ET AL  2,774,378
VALVE

Filed March 10, 1951  4 Sheets-Sheet 1

INVENTORS.
Earl F. Mekelburg
Carl B. Sohns.
BY
Myron J. Seibold
ATTORNEY.

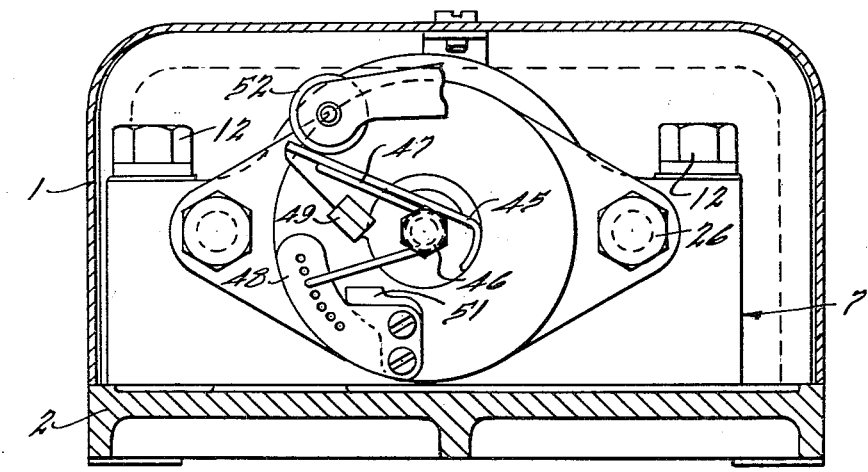
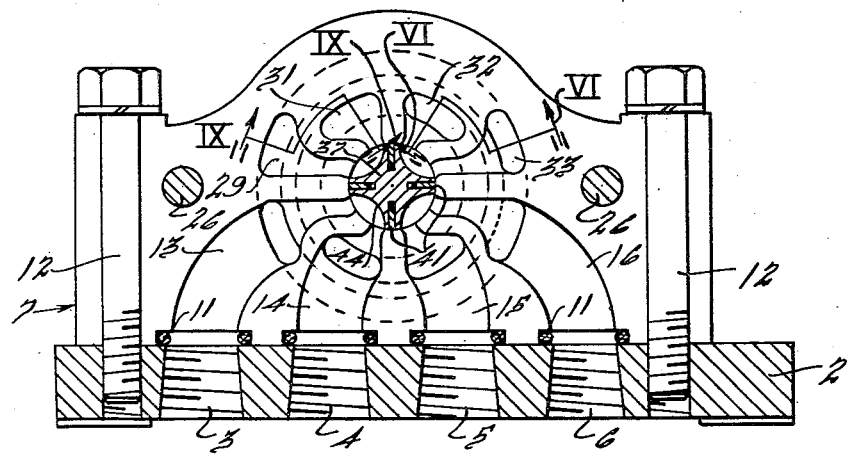

Dec. 18, 1956  E. F. MEKELBURG ET AL  2,774,378
VALVE
Filed March 10, 1951  4 Sheets-Sheet 3
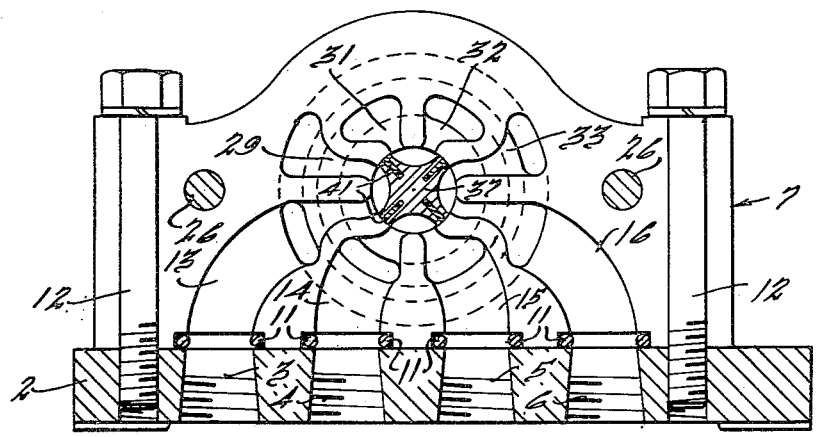
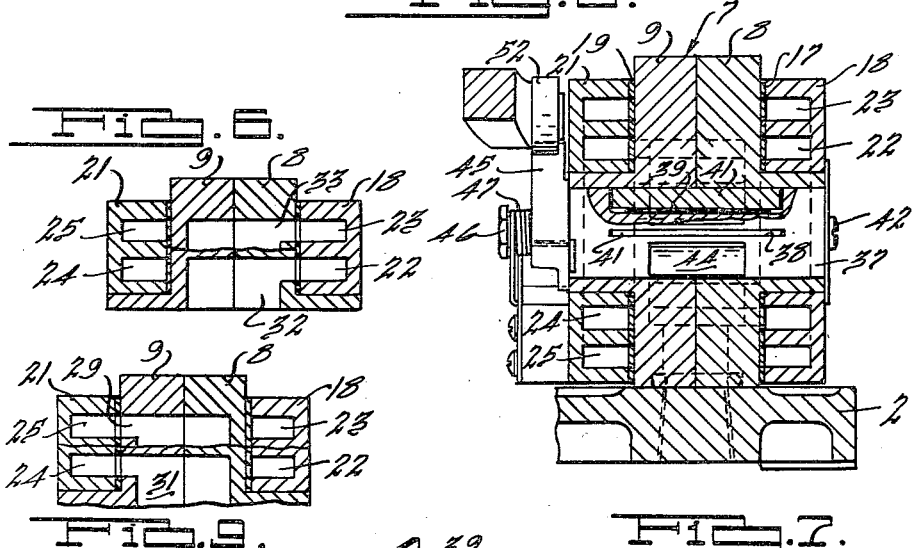
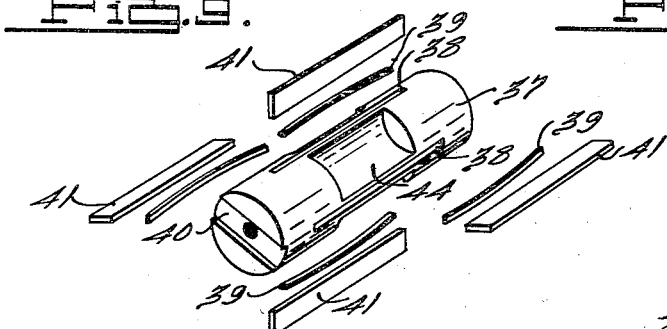
INVENTORS.
Earl F. Mekelburg
Carl B. Johns.
BY
Myron J. Seibold
ATTORNEY.

Dec. 18, 1956 E. F. MEKELBURG ET AL 2,774,378
VALVE
Filed March 10, 1951 4 Sheets-Sheet 4
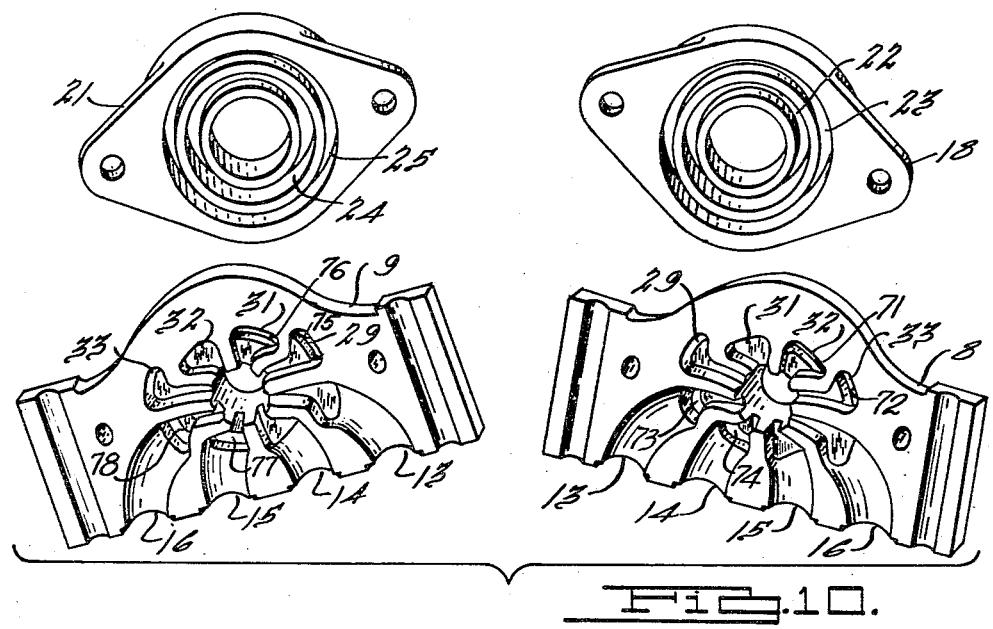
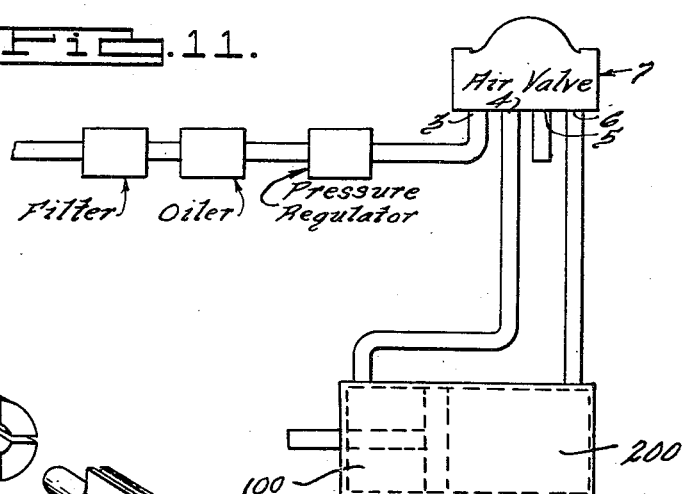
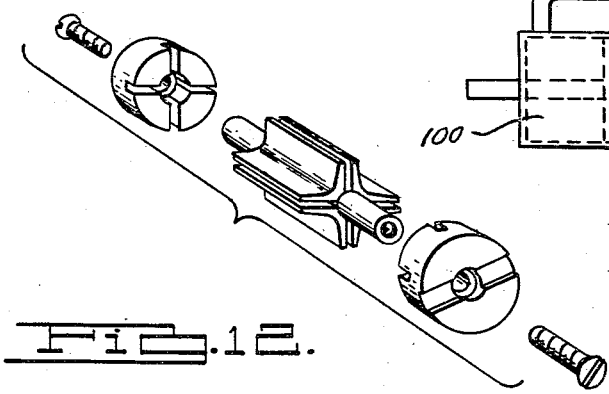
INVENTORS.
Earl F. Mekelburg
Carl B. Sohns.
BY
Myron J. Seibold
ATTORNEY.

United States Patent Office 2,774,378
Patented Dec. 18, 1956

2,774,378
VALVE

Earl F. Mekelburg, Wauwatosa, and Carl B. Sohns, Milwaukee, Wis., assignors to Square D Company, Detroit, Mich., a corporation of Michigan Application March 10, 1951, Serial No. 214,962

13 Claims. (Cl. 137—623)

This invention relates to electrically operated valves for controlling pressurized fluid flow and, more specifically, to an electrically operated valve of the type employed in a system where fluid under pressure is utilized to do work.

Still more specifically, this invention relates to a valve for controlling the entrance of air under pressure into, and the exit of air from, a reciprocable piston in which the position of the valve is responsive to the energization of an electromagnet.

One object of the present invention is the provision of an improved electrically operated valve which is sturdy and compact, and economical to construct.

Another object of the invention is the provision of an improved electrically operated valve directly controlled by an electromagnetic device which requires little power to operate.

Still another object of the present invention is the provision of an electrically operated valve, in accordance with the preceding objects, which has very few moving parts, and which has an operating life which is many times that of similar older devices.

A further object is the provision of a valve controlled by an electromagnetic device in which a variable relationship between the valve operating lever and a lever moved by the armature of an electromagnet is employed, whereby the closing shock imparted to the electromagnet is minimized.

Another object of the invention is the provision of a novel electrically operated air valve in which the change from one stable operating position to another is rapidly effected.

Another object of the invention is the provision of an electrically operated valve which will operate in any mounted position without being adversely affected by gravitational pull.

Other objects and features of the invention will be readily apparent to those skilled in the art from the specification and appended drawings illustrating certain preferred embodiments in which:

Figure 3 is a sectional view along the lines III—III of Figure 1.

Figure 4 is a sectional view along the line IV—IV of Figure 1.

Figure 5 is a sectional view also along the lines IV—IV of Figure 1, in which the rotor has been moved about 45 degrees from the position illustrated in Figure 4.

Figure 6 is a detailed view along the lines VI—VI of Figure 4.

Figure 7 is a detailed view along the lines VII—VII of Figure 1, with part of the rotor broken away.

Figure 8 is an exploded view of one form of rotor for the present invention and its cooperating parts.

Figure 9 is a detailed view along the lines IX—IX of Figure 4.

Figure 10 is an exploded view of complementary parts of the valve body.

Figure 11 is a diagrammatic representation of the device of the present invention in an operative connection.

Figure 1 is an exploded view of a second type of rotor for use in the present invention.

Figure 1:
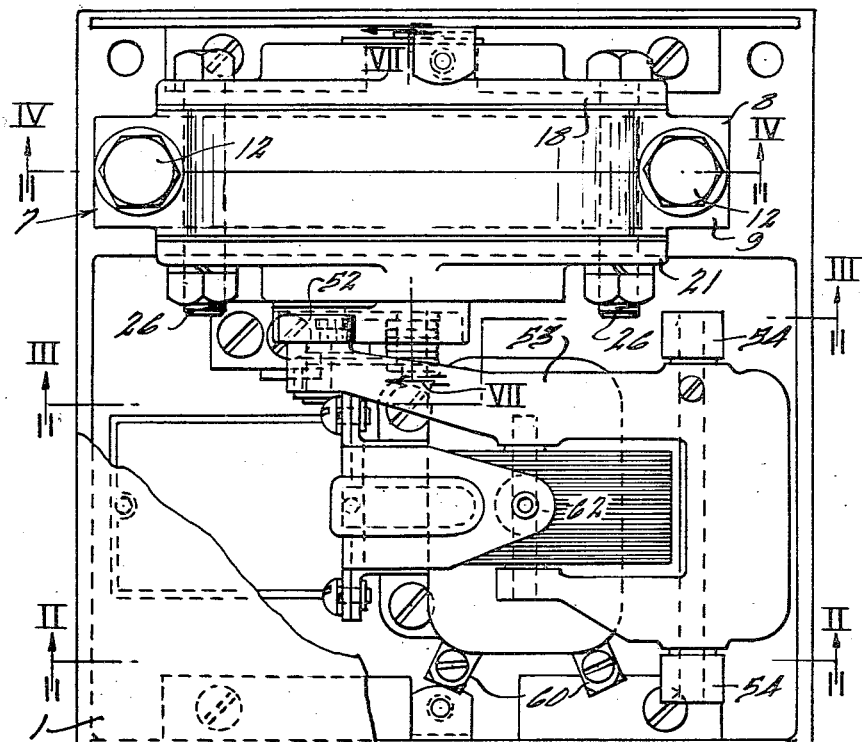
Figure 1 shows a top plan view of the structure of the present invention with part of the cover broken away to show internal parts.

The device of the present invention comprises an outer metallic cover 1 which is mounted upon a base 2 of a material such as cast iron, the base being provided with suitable holes for the mounting the cover 1, and having in addition four threaded orifices 3, 4, 5 and 6, as shown in Figure 4. Mounted upon the base 2 by bolts 12 is a two piece valve body 7 comprised of two identical, complementary portions 8 and 9 forming channels 13, 14, 15 and 16, the halves of these channels formed by portion 8 being shown in Figure 5. One end of each of these channels directly communicates with one of the threaded orifices 3, 4, 5 and 6, sealing rings 11 being provided at the connection between the valve body and the base. These channels, at their interior ends, communicate with a central passage which is more fully described later.

Mounted to the back of portion 8 of the valve body 7 is an end plate 18, a sealing gasket 17 being interposed therebetween, a second gasket 19 and end plate 21 serve to sealably close the back of the portion 9 of the valve body 7, these elements being fixedly held together by means of the bolt and nut fasteners 26. The end plates 18 and 21 are identical and have two concentric, annular passages separated by a solid circular wall, the passages of end plate 18 being numbered 22 and 23, while those of end plate 21 are numbered 24 and 25.

The complementary portions 8 and 9 of the two piece valve body 7 together form four chambers 29, 31, 32 and 33 whose interior ends communicate with the central passage, those halves of these chambers formed by portion 8 being shown in Figure 5. In the portion 8, the end of chambers 32 and 33 are aperture at 71 and 72 respectively to effect communication of concentric passages 22 and 23, respectively, of end plate 18 with these open end chambers, as shown in Figure 10. Portion 8 is also apertured at 73 to connect channel 13 with passage 23 and at 74 to connect channel 14 with passage 22.

In the portion 9 of the valve body 7, the outer ends of chambers 29 and 31 are apertured at 75 and 76 to effect communication with the annular passages 24 and 25, respectively, of end plate 21. In addition, portion 9 is further apertured at 77 and 78 to connect channels 15 and 16 with passages 24 and 25 respectively.

The complementary portions 8 and 9, which together form the chambers 29, 31, 32 and 33, and the channels 13, 14, 15 and 16 are so arranged, as will be seen from an inspection of Figure 10, that each chamber and each channel has an outer end aperture in only one portion of the valve body so that there is no direct communication between the angular passages of one end plate with those of the other end plate.

Extending through the valve body portions 8 and 9 and central hubs integral therewith is a cylindrical opening in which is rotatably disposed a rotor 37 having therein four slots 38 which extend axially along the rotor for a portion of its length. In each of these slots 38 there is enclosed a light spring member 39 which acts to bias a sealing vane 41 outwardly against the interior surface of the cylindrical opening. In Figure 8 there is shown an exploded view of the rotor and the aforementioned parts which cooperate with it. The surface of rotor 37 is provided with four concave cavities 44 which extend over a portion of the length of the rotor 37, these cavities 44 bridging the entrance to two of the adjacent chambers and channels formed by the portions of the valve body when the rotor 37 is in either of its two operating positions, those shown in Figures 4 and 5. It should be noted that the sealing vanes 41 isolate the cavities 44 one from the other by pressing against the interior surface of the cylindrical opening.

In Figure 12 there is illustrated a modified rotor assembly which when assembled operates in the same manner as rotor 37. This rotor is formed of several pieces to facilitate manufacture and with close tolerances the vanes 41 may be omitted.

One end of rotor 37 has a slot 40 into which a keying extension of a lever 45 is mounted by a shouldered screw 46. Mounted about an extension of the screw 46 there is a strong coil spring 47, one end of which is brought out to a bias adjustment bracket 48 having a series of holes in which this end of the spring may be positioned to vary the force which the spring exerts. The other end of coil spring 47 acts upon an undersurface of lever 45, biasing that lever to the position shown in Figures 2 and 3 when the magnet is not energized. The under surface of the lever 45 carries an abutment 49 which is adapted to cooperate with a second abutment 51, mounted adjacent to the bracket 48, to limit the movement of lever 45 as it moves in counter-clockwise direction from the position shown in Figure 3.

Mounted so as to act upon the upper surface of lever 45 is a roller 52, the roller being rotatably mounted upon the longer arm of a generally U shaped member 53 which is pivotally mounted upon extending ears 54 of the bracket 55. The bracket 55 is rigidly mounted, as by studs, to a two piece metallic frame 56, the frame itself being secured by studs to the base 2. Carried by the frame 56 is a generally E shaped magnetic core 57 upon which is mounted an energizing coil 58 having terminals 60 for the connection of conductors. Pivotally mounted to and between the arms of the generally U shaped member 53 is a magnetic T shaped armature 59 which is attracted to the E shaped core upon energization of coil 58. A second bracket 61, also supported by frame 56, is provided with a rubber abutment 62 which acts to limit the amount of movement of the T shaped armature 59 away from the core 57.

The operation of the device of the present invention may be illustrated by describing its use in conjunction with a conventional double acting piston as shown in Figure 11. That portion of the cylinder to the left of the piston head is designated as cylinder 100, while the portion of the cylinder to the right of the piston head is designated as cylinder 200. It should be noted, initially, that the mounting position of the device of the present invention is of no importance, this device being readily mountable as conditions dictate, the operation of the device in no way being adversely affected by the force of gravity.

As shown in Figure 11, to the threaded orifice 3 there is connected piping carrying air under pressure from the supply through conventional filter, oiler and regulator mechanisms; the threaded orifice 4 is connected to cylinder 100; the threaded orifice 5 to an exhaust pipe; and the threaded orifice 6 to cylinder 200.

Figure 2:
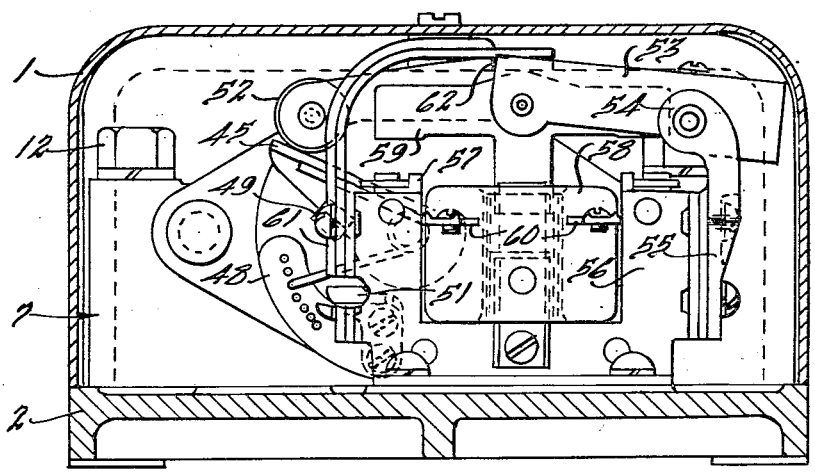
Figure 2 is a sectional view along the lines II—II of Figure 1.

When the energizing coil 58 is not energized, the spring 47 acts upon the under side of lever 45 to bias it into the position shown in Figures 2 and 3. The roller 52 is consequently moved to the position shown in the aforementioned figures, and so carries the arm of the U shaped member 53 to which is attached into a plane which is approximately horizontal as viewed in Figures 2 and 3. The T shaped armature 59 is thereby moved away from the core 57 a distance which is determined by the abutment 62 of bracket 61. In this position of the operating parts, the lever 45 has moved rotor 37 to the position shown in Figure 4.

Air under pressure will then pass from the source through the threaded orifice 3 and into channel 13. Air will pass through the associated cavity in rotor 37 into channel 14 and thence through orifice 4 to cylinder 100. The spring biased sealing vanes prevent lateral leakage of this air to adjacent channels. Air from the supply will also pass through the aperture in the valve body portion 8 into the passage 23 of end plate 18. This enters chamber 33 through the aperture therein, and through that chamber to impinge upon the surface of the rotor cavity which bridges the entrances to chambers 33 and 32. This air flows then into the chamber 32, and through the aperture of that chamber into the annular passage 22 of end plate 18 whence it also flows into channel 14 and thence to cylinder 100. It should be noted that air from the supply, under pressure, impinges upon the rotor member 37 on surfaces which are diametrically opposed, the result being that the pressures exerted against the rotor are balanced and side thrust upon the rotor is minimized.

As air under pressure enters cylinder 100, the piston aforementioned will, of course, move to force the air which exists in cylinder 200 out through the piping which connects it to orifice 6. This air will proceed through the channel 16 and a part of it will go through the aperture therein, this aperture being in portion 9 of valve body 7, into the annular passage 25 of end plate 21. It will then flow through passage 25 into chamber 29 through the aperture therein. This air will then enter chamber 31 after passing through the adjacent rotor cavity, and then into the annular passage 24 of end plate 21 which will carry the air to channel 15 and thence through orifice 5 to exhaust. Meanwhile, another portion of this air from cylinder 200 will pass directly from channel 16 to channel 15 and to exhaust. It will be noted that the air from cylinder 200 also strikes the rotor member at two diametrically opposed points to balance the air pressure against the rotor in order to avoid side thrust thereon.

On energization of the coil 58, the control of which may be located at any distance from the unit described, the T shaped armature 59 is attracted toward the core 57. As armature 59 moves downward from the position shown in Figure 2, the U shaped member 52 is moved counterclockwise about its pivot upon the ears 54 of bracket 55. The roller 52 is thereby moved downward along the surface of lever 45, this lever being forced to rotate against the bias of the spring 47. Rotor 37 is rotated as lever 45 moves, this rotation of the rotor being effected by means of cooperation between the keying extension of lever 45 and the keying slot 40 in the rotor itself.

As the roller 52 is moved downward, the distance between the center of rotation of the lever and the point at which pressure is applied to the lever through the medium of roller 52 is constantly decreased. This action results in a constantly decreasing mechanical advantage which has two advantageous effects. In the first place, the power available from the energized electromagnet is fully utilized, thus permitting the employment of a minimum size electromagnet operating with a small power requirement. Secondly, this arrangement provides that the force of spring 47 more strongly opposes the movement of armature 59 toward core 57 as the armature closes upon the core, thus tending to minimize the shock associated with magnet closing, and the life of the mechanism is thereby materially increased.

With the armature fully in contact with the core, the rotor 37 is in the position illustrated in Figure 5. The comparison of Figure 5 with Figure 4 will indicate that the rotor has been rotated only about 45°, and it is obvious that this small positional change can be rapidly effected.

In this position, air from the supply in channel 13 will have two paths to channel 16 and cylinder 200, one through passage 23, chamber 33, adjacent rotor cavity to channel 16; the other through the rotor cavity bridging channel 13 and chamber 29 into passage 25 and channel 16.

As the air enters cylinder 200, the reciprocable piston is forced to move and reduces the volume of cylinder 100. This air being exhausted from cylinder 100 passes through the piping which connects it to orifice 4 where it proceeds into channel 14. It will then have two paths to exhaust; one through a rotor cavity to channel 15 and exhaust; the other through passage 22, chamber 32, rotor cavity, chamber 31, passage 24 to channel 15 and exhaust. Air in channel 14 passes through the orifice therein and into annular passage 22 of end plate 18, from which it proceeds through the open end of chamber 32 into that chamber; then it strikes against the rotor to enter chamber 31. It proceeds through the open end of chamber 31 into passage 24 of end plate 21, through which it passes through the opening in channel 15, and out to the exhaust through threaded orifice 5. It should be noted again that air under pressure strikes all four of the surfaces of cavities 44 of the rotor 37, side thrust of the rotor being substantially eliminated by the balanced application of pressure.

As the coil 58 is deenergized, the operating parts will return, under the bias of spring 47, to the position illustrated in Figures 2 and 4. As spring 47 exerts a substantial bias, this movement is rapidly accomplished, the T shaped armature 59 moving away from the core 57 until it strikes against the rubber abutment 62 which limits its upward movement.

It will be seen that in all cases air being exhausted from the operating cylinders passes through the valve body of the device of the present invention before being carried away by external piping. By this arrangement, the exhaust air cools the valve body and minimizes any tendency of the parts to seize. It should further be noted that the device of the present invention employs a rotor which is very small in diameter, the rotor needing to be only large enough to provide cavities which bridge adjacent entrances. By thus employing a rotor of very small diameter, the power required to effect movement thereof is minimized. The advantage of utilizing a device having a very small diameter rotor will be better appreciated when it is pointed out that the turning torque required is proportional to the square of the diameter of the turning member.

It is clear, therefore, that the device of the present invention is a greatly improved electrically operated valve which is capable of being mounted in any position without adverse operating effect. This device directly controls the flow of air, or other medium under pressure, yet operates with a power requirement no more than that of a pilot operated device. Further, this device is so constructed that only a few moving parts are employed, and these are quite small so that the cost of the device is minimized, yet the operating life of the mechanism is greatly extended over that for older similar devices. Still further, this device while being easily adjustable and readily removable for cleaning, is of a very small overall size. As a further advantage, it will be seen that the device of this invention operates with extreme rapidity, thus permitting close electrical timing between the device and associated system elements.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In an electrically operated device for controlling the flow of pressurized fluid, a valve body having a plurality of passages therein through which said fluid passes, means within said valve body for directing the flow of fluid through said passages, means biasing said directing means toward one position, and electromagnetic means including an armature and core for controlling the position of said directing means, said armature having a connection to said directing means which decreases in mechanical advantage as said armature approaches said core whereby the shock associated with closing of said armature upon said core is minimized.

2. In an electrically operated device for controlling the flow of pressurized fluid, a valve body having a plurality of passages therein through which said fluid passes, means within said valve body for directing the flow of fluid through said passages, means for adjustably positioning said directing means to achieve a desired flow path for said fluid through said valve body including means biasing said directing means toward one position and a lever connected to said directing means for operating said directing means to another position, electromagnetic means including a coil, a core, and an armature attracted to said core upon energization of said coil, and means connecting said lever to said armature, said lever having a connection to said directing means which decreases in mechanical advantage as said armature is attracted to said core whereby the shock associated with the closing of said armature upon said core is minimized.

3. In an electrically operated device for controlling the flow of pressurized fluid, a valve body having a plurality of passages therein through which said fluid passes, a rotor within said valve body, rotatable means for adjustably positioning said rotor, a lever having one portion thereof movably positioned upon said last mentioned means, a spring biasing said lever toward one position, an electromagnetic coil, a core, and an armature movable toward said core upon energization of said coil, and means connecting said lever to said armature whereby said lever moves upon attraction of said armature, the end of said lever positioned on said last mentioned means being moved toward the center of rotation of said last mentioned means as said armature approaches said core whereby the closing shock associated with the closing of said armature upon said core is minimized.

4. In an electrically operated device for controlling the flow of pressurized fluid, a valve body having a plurality of passages therein through which said fluid passes, a rotor within the said valve body, rotatable means for adjustably positioning said rotor, a lever having a roller thereon which is movably positioned upon said last mentioned means, a spring biasing said lever toward one position, an electromagnetic coil, a core, and an armature movable toward said core upon energization of said coil, and means connecting said lever to said armature whereby said lever moves upon attraction of said armature, said roller being moved toward the center of rotation of said last mentioned means as said armature approaches said core whereby the shock associated with the closing of said armature upon said core is minimized.

5. In an electrically operated device for controlling the flow of pressurized fluid; electromagnetic means including an armature, a core, and an energizing coil, a valve body having a plurality of separate chambers with entrances thereto defining a central aperture extending laterally through said valve body, a pair of end plates each adjacent one side of said valve body and having separate passages therein, openings in said chambers registering with said passages for communicating said passages with said chambers, means within said aperture for controlling the flow of fluid flow through said valve body and end plates, rotatable means for adjustably positioning said controlling means to achieve a desired flow path for said fluid through said valve body, means biasing said last mentioned means toward one position, a lever connected to said last mentioned means for operating said last mentioned means, and means connecting said lever to said armature, said lever having a connection to said last mentioned means which decreases in mechanical advantage as said armature is attracted by said coil whereby the shock associated with the closing of said armature upon said core is minimized.

6. In an electrically operated device for controlling the flow of pressurized fluid, a valve body having a plurality of distinct channels and chambers therein, means for communicating certain of said valve body channels to a source of pressurized fluid and others to a fluid operative device, each of said channels and chambers having an entrance, said entrance defining a central aperture extending laterally through said valve body, said valve body being so constructed and arranged that said channels and chambers are circumferentially spaced about said aperture, means for selectively interconnecting certain of said channel and chamber entrances for directing fluid flow therebetween, each of said channels being disposed at the opposite side of said directing means from one of said chambers, means providing fluid flow between opposing channels and chambers whereby the forces exerted by said fluid upon said directing means are balanced, said means providing fluid flow comprising opposite side plates mounted on said valve body and having separate passages therein isolated from each other, said valve body having openings therein for permitting fluid flow between said channels and chambers through said passages.

7. In an electrically operated device for controlling the flow of pressurized fluid, a valve body having a plurality of distinct channels and chambers therein, means for connecting certain of said valve body channels to a source of pressurized fluid, and others to a fluid operated device, each of said channels and chambers having an entrance, said entrance defining a central aperture extending laterally through said valve body, said valve body being so constructed and arranged that said channels and chambers are circumferentially spaced about said aperture, means for selectively interconnecting certain of said channel and chamber entrances for directing fluid flow therebetween, each of said channels being disposed at the opposite side of said directing means from one of said chambers, means providing fluid flow between opposing channels and chambers whereby the forces exerted by said fluid upon said directing means are balanced, said means providing fluid flow comprising opposite side plates mounted on said valve body and having a plurality of separate passages therein isolated from each other, said valve body having openings therein for permitting fluid flow between said channels and chambers through said passages.

8. In an electrically operated device for controlling the flow of pressurized fluid, a valve body having a plurality of distinct channels and chambers therein, means for connecting certain of said valve body channels to a source of pressurized fluid and others to a fluid operative device, each of said channels and chambers having an entrance, said entrances defining a central aperture extending laterally through said valve body, said valve body being so constructed and arranged that said channels and chambers are circumferentially spaced about said central aperture, means for selectively interconnecting certain of said channels and chambers for directing fluid flow therebetween, each of said channels being disposed at the opposite side of said directing means from one of said chambers, and means providing fluid flow between opposing channels and chambers whereby the forces exerted by said fluid upon said directing means are balanced.

9. In an electrically operated device for controlling flow of pressurized fluid, a valve body having a plurality of distinct channels and chambers therein, means for connecting certain of said valve body channels to a source of pressurized fluid and others to a fluid operative device, each of said channels and chambers having an entrance thereto centrally disposed within said valve body, said entrances defining a circular aperture extending laterally through said valve body, said valve body being so constructed and arranged that said channels and chambers are circumferentially spaced around said circular aperture, a rotor within said aperture having surface cavities therein for bridging only adjacent entrances to direct fluid flow therebetween, each of said channels being disposed at the opposite side of said rotor from one of said chambers, a pair of opposite side plates each mounted to one side of said valve body and having separate passages therein isolated from each other for interconnecting said channels and chambers whereby the forces exerted by said fluid upon said rotor are substantially balanced, and openings in said channels and chambers for registering with said passages for permitting fluid flow between said channels and chambers and said passages.

10. In an electrically operated device for controlling the flow of pressurized fluid, a valve body having a plurality of distinct channels and chambers therein, means for connecting certain of said valve body channels to a source of pressurized fluid and others to a fluid operative device, each of said channels and chambers having an entrance thereto centrally disposed within said valve body with said entrances defining a circular aperture which extends laterally through said valve body, said valve body being so constructed and arranged that said channels and chambers are circumferentially spaced about said circular aperture, a rotor within said aperture having at least two pair of arcuate surface portions thereon each for bridging only adjacent entrances to direct fluid flow therebetween, each of said arcuate surfaces on said rotor being directly opposite a similar arcuate rotor surface, each of said channels being disposed at the opposite side of said rotor from one of said chambers, means providing fluid flow between opposing channels and chambers whereby the forces exerted by said fluid upon said directing means are balanced, said means providing fluid flow comprising a pair of opposite side plates each mounted to one side of said valve body and having separate passages therein isolated from each other, said valve body having openings therein registering with said passages for permitting fluid flow between said channels and chambers through said passages.

11. In an electrically operated device for controlling the flow of pressurized fluid, a valve body having a plurality of distinct channels and chambers therein, means for connecting certain of said valve body channels to a source of pressurized fluid and others to a fluid operative device, each of said channels and chambers having an entrance thereto centrally disposed within said valve body with said entrances defining a circular aperture which extends laterally through said valve body, said valve body being so constructed and arranged that said channels and chambers are circumferentially spaced about said circular aperture, a rotor within said aperture having surfaces therein for bridging only adjacent entrances to direct fluid flow therebetween, each of said rotor surfaces being directly opposite a similar rotor surface, each of said channels being disposed at the opposite side of said rotor from one of said chambers, means providing fluid flow between opposing channels and chambers whereby the forces exerted by said fluid upon said rotor are balanced, said means providing fluid flow comprising a pair of opposite side plates each mounted to one side of said valve body and having passages therein isolated from each other, said valve body having openings therein registering with said passages for permitting fluid flow between said channels and chambers through said passages.

12. The device defined in claim 11 in which means are provided on said rotor for preventing direct fluid flow between adjacent rotor surfaces.

13. The device defined in claim 11 in which means are provided on said rotor for preventing direct fluid flow between adjacent rotor surfaces, and in which said side plate passages are concentric with said valve body aperture.

References Cited in the file of this patent

UNITED STATES PATENTS

| | | |
|---|---|---|
| 565,845 | Douglas | Aug. 11, 1896 |
| 1,932,976 | Lamb et al. | Oct. 31, 1933 |
| 2,067,417 | Sallee | Jan. 12, 1937 |
| 2,182,459 | Vickers | Dec. 5, 1939 |
| 2,308,727 | Temple | Jan. 19, 1943 |
| 2,311,069 | Miller | Feb. 16, 1943 |
| 2,313,257 | Nelson | Mar. 9, 1943 |
| 2,522,249 | Baker | Sept. 12, 1950 |